United States Patent Office 3,199,662
Patented Aug. 10, 1965

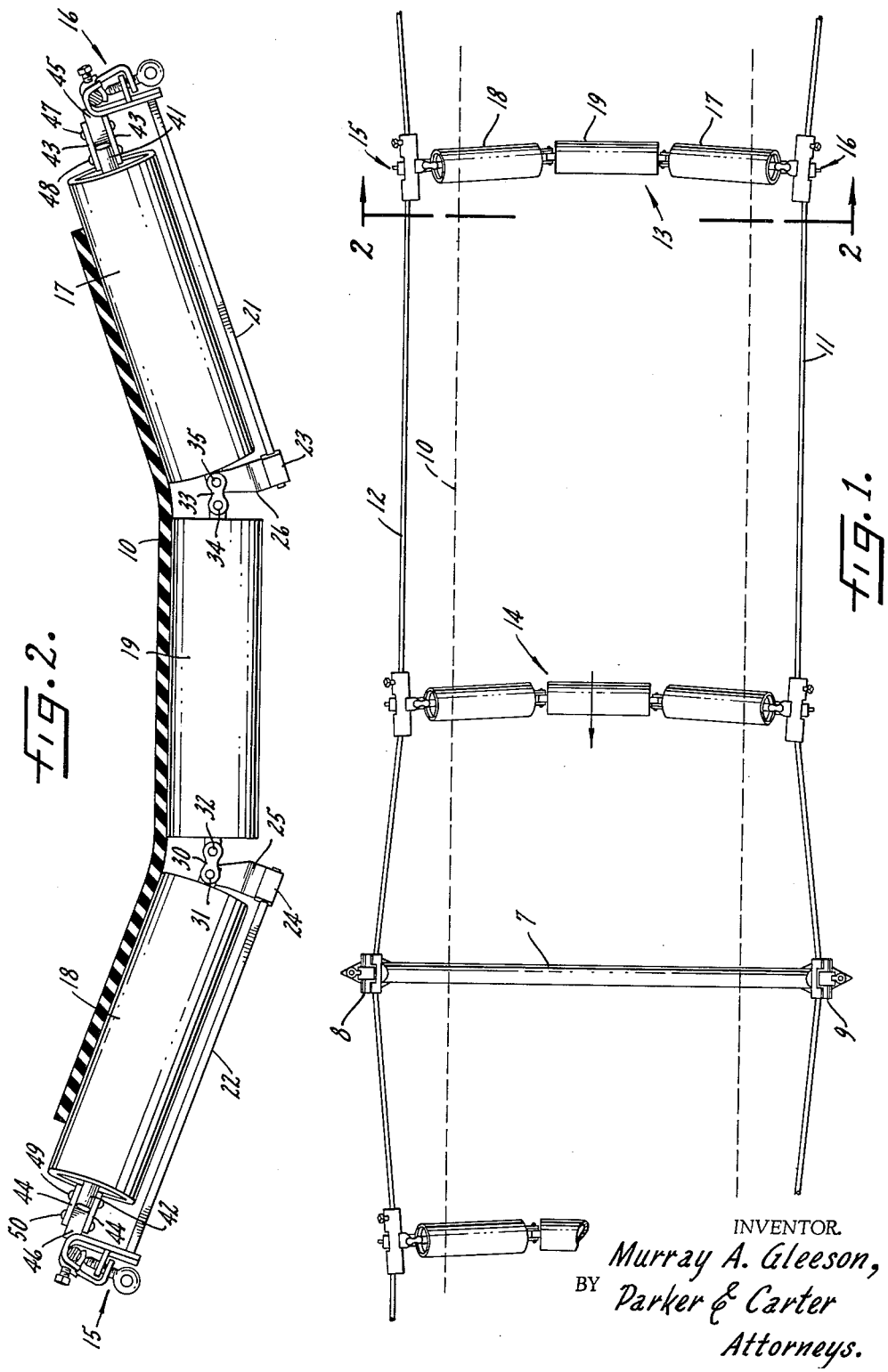

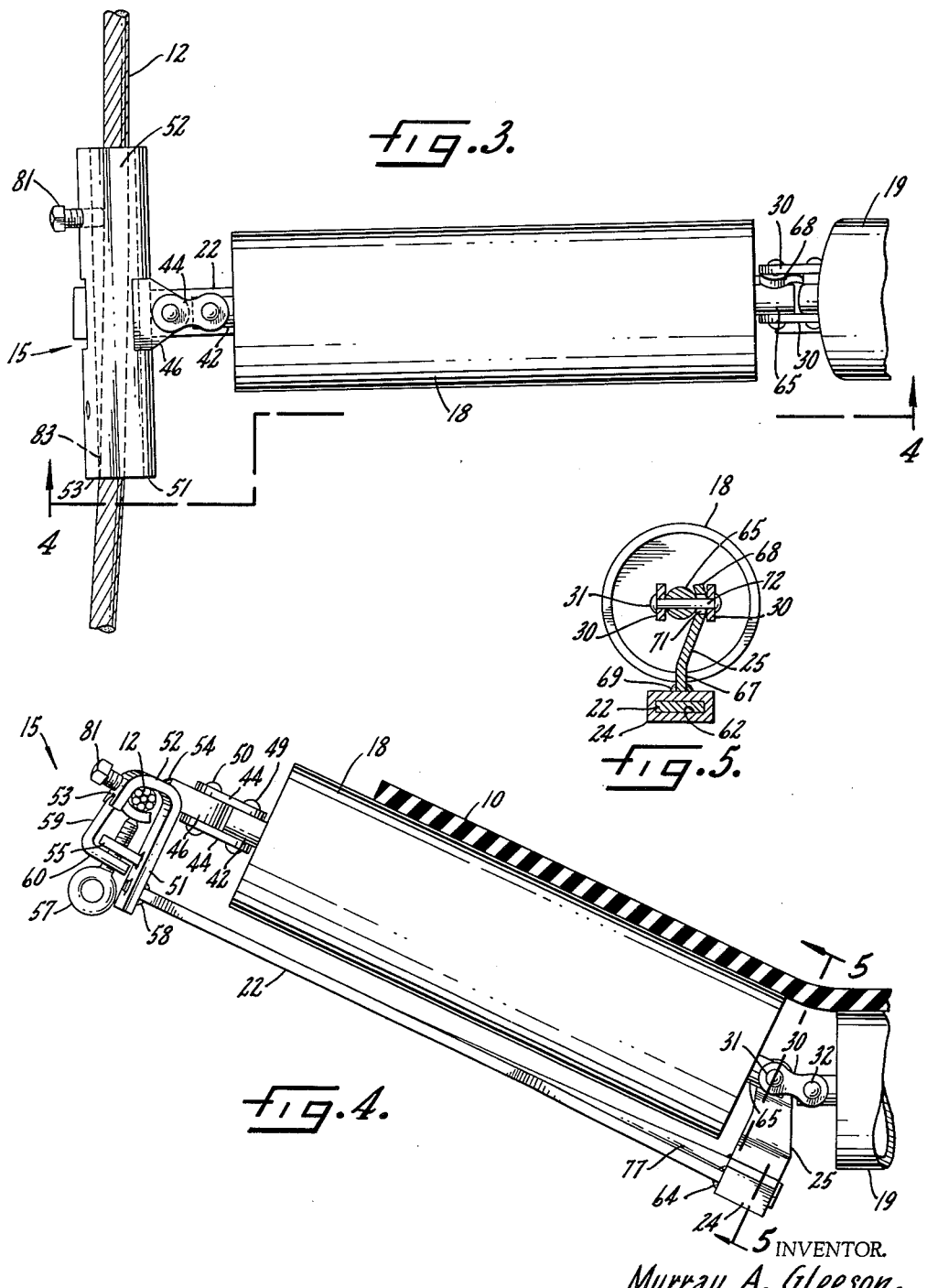

3,199,662
SHOCK ABSORBING TROUGHING IDLER
ASSEMBLY FOR INCLINING CONVEYORS
Murray A. Gleeson, Downers Grove, Ill., assignor to
Goodman Manufacturing Company, Chicago, Ill.,
a corporation of Illinois
Filed Feb. 16, 1962, Ser. No. 173,641
8 Claims. (Cl. 198—192)

This invention relates to a troughing idler assembly for a sideframe wire rope conveyor, in particular, to a troughing idler assembly for inclining conveyors.

An object of this invention is a troughing idler assembly which is positioned for downstream conveyance in an inclined conveyor.

Another object is to provide a troughing idler assembly which maintains proper roller position on inclined conveyors.

Another object is to provide a troughing idler assembly wherein the center roller is maintained in proper position on inclined conveyors.

Another object is a troughing idler assembly having means to absorb shock from overlying loads.

Another object is a shock absorbing means which also maintains the center roller in proper position for inclined conveyors.

Another object is means to turn the elongated connector on the wire rope and thereby position the troughing idler assembly for inclined conveyancing.

Another object is a means to turn the elongated connector on the wire ropes for canting the troughing idler assembly in a downstream direction.

Another object is a torsion member and bracket plate for a troughing idler assembly whereby shocks to the assembly are transmitted along the bracket to the torsion member.

Another object is a torsion member and attached bracket which properly maintains the center roller in a proper position for inclined conveyancing.

The foregoing objects and other objects are now attained by the invention which will be described in detail and which is illustrated in the accompanying drawings wherein:

FIGURE 1 is a top view of a portion of a side-frame wire rope conveyor with troughing idler assemblies suspended between the ropes, FIGURE 2 is a view along line 2—2 of FIGURE 1, FIGURE 3 is an enlarged top view of an elongated connector and a connected wing roller, FIGURE 4 is a view along line 4—4 of FIGURE 3, and FIGURE 5 is a sectional view of the inner end of a wing roller taken on line 5—5 of FIGURE 4.

Like numerals in the various views will refer to the same structures.

FIGURE 1 is intended to illustrate a portion of a sideframe wire rope conveyor extending along an imaginary inclined surface such as a hill. The surface is inclined towards its lowest point which is indicated by the direction of the arrow. The conveyor has the usual wire ropes 11 and 12 and troughing idler assemblies such as 13 and 14 spaced along the length of the conveyor. Troughing idler assembly 13 has elongated connectors 15 and 16 engaging ropes 12 and 11, respectively. Wing rollers 17 and 18 are connected to the elongated connectors and to a center roller 19. Each of said rollers is rotatably mounted on a shaft. The conveying reach 10 of an endless belt (indicated by phantom outline) rides over the idler assemblies in a downstream direction (towards the low point of the incline) as indicated by the direction of the arrow. The endless belt has a return reach which rides on return rollers fixed at a point below the troughing idler assemblies. The return roller and the return reach are not shown. The wire ropes 11 and 12 are supported along the length of the conveyor on upright stands such as at 8 and 9, and are further supported by a crossbrace 7 extending between such stands. The troughing idler assemblies 13 and 14 are shown as canted inwards and the center roller is shown as being retained in a proper downstream position.

FIGURE 2 shows a troughing idler assembly having torsion members 21 and 22 extending directly below and along the length of the wing rollers 18 and 17. The torsion members are fixed to the elongated connector at one end and the other end is received in collars 23 and 24. Bracket plates 25 and 26 join the collars to the inner ends of the wing roller shafts at a point where links articulate the rollers. On one side, link 30 makes an articulating connection between the inner end of the wing roller shaft and the end of the center roller shaft along axes 31 and 32, and, on the other side, link 33 makes an articulating connection between the corresponding shaft ends along axes 34 and 35. The outer ends of the wing roller shafts 41 and 42 are connected by links 43 and 44 to lugs 45 and 46 along axes 47, 48 and 49, 50.

Referring to FIGURE 4, it is seen that torsion bar 22 is secured by weld 58 to a long wall 51 extending from one side of a curved rope seat 52 of the elongated connector 15. A short wall 53 extends from the other side of the curved rope seat. Lug 46 is secured at about the curved rope seat 52 by a weld or equivalent means 54. The inside surface of the long wall 51 has a flange 55 with an aperture to receive clamping screw 57. The wire rope 12 is loosely enclosed by the curved rope seat, by which is meant that the width of the curved rope seat 52 is greater than the diameter of the rope to provide a space on each side of the rope. The rope is tightly engaged against the curved rope seat by clamping member 59 which presses against the underside of the wire rope and forces said rope into tight engagement with the curved rope seat. The clamping member has a flange 60 which is also apertured to receive the screw 57.

The torsion member 22 is shown here as a flat bar which may be constructed from a variety of materials but which is preferred to be a steel spring bar. Such a bar will twist after a longitudinal impact as shown at 77 in FIGURE 4. The bar is received by generally rectangular collar 24 which has a matching slot 62 (FIGURE 5) to receive one end of the bar 22. The end of the bar 22 may be secured to the collar 24 by weld 64 or the like. An offset bracket plate 25 joins the collar 24 to one side of the inner end 65 of the wing roller shaft. The connection by the bracket plate 25 is better seen in FIGURE 5 where the offset bracket plate 25 has a lower vertical portion 67 which is secured to about the middle of the rectangularly shaped collar 24 by weld 69. An upper vertical portion 68 is offset and is pivotally linked to one side of the inner end 65 of the wing roller shaft. The upper portion 68 has an aperture 71 through which a pin 72 is passed. This pin forms a common linkage for the bracket plate 25, the links 30 and the inner end 65 of the wing roller shaft. The pin 72 also provides an axis point 31 in links 30. The aperture 71 is larger than the diameter of the pin 72 to allow some play for the pin when overlying loads on the troughing idler assembly cause the rollers to be displaced in an up-and-down direction.

The elongated connector 15 is adapted to turn on the wire rope 11 and be fixed in the turned position. The turning of the elongated connector will displace the center roller backwards or in an upstream direction because the vertical linkage between the wing roller and the center roller will not accommodate the turning of the elongated connector and the attached torsion bar and bracket plate. The horizontal linkage between the connector and the wing roller will accommodate such turning, and this results in canting the wing roller inward for proper training of the conveying reach of the endless belt riding thereon. The wire rope 11 is of a diameter which is smaller than the width between the short wall 53 and the long wall 51 extending from the curved rope seat 52. A screw 81 is placed through the short wall 53 and may be turned to contact the rope 11 and force that portion of the rope contacted by the screw against the long wall 51. This action will flex the rope so a noncontacted portion of the rope 11 in the other part of the elongated connector is pushed against the short wall 53 as at 83. When the elongated connector 15 is so turned on the wire rope, the torsion bar 22 attached to the long wall 51 of the connector turns as well as the offset bracket plate 25 secured to the rectangular collar 24 at the other end of the bar 22. It will be appreciated that other means could be used for turning the elongated connector 15 on the wire rope 11, such as wedges appropriately inserted at the opposite open ends of the elongated connector between the wire rope and the short wall on one side and between the wire rope and the long wall on the other side.

The use and operation of my invention are as follows:

The conveying reach of an endless belt riding on a troughing idler assembly forms a bed generally as shown in FIGURE 2, that is, the middle of the belt is at a lower level than the sides of said belt. The wing rollers of the idler assembly are also canted inwards to exert a good training effect on the belt. The troughing idler assembly should maintain this roller relationship whether the assembly is suspended from a conveyor on level ground or on inclined levels. It will be apparent that if the conveyor is inclined because of a hill or the like, there will be a tendency for the center roller to move in the direction of inclination or towards the low point of inclination. When the downstream direction of belt travel is towards the low point, then such tendency will result in the wing rollers losing their canted position and their consequent training effect on the traveling belt.

When a conveyor is set up on an inclined surface, such as a small hill, the inward canting of the wing rollers and the proper position of the center roller will be maintained with the troughing idler assembly disclosed herein. The elongated connector 15 will be turned on the wire rope by a position screw 81 flexing the wire rope 11 or by equivalent means. The end of the elongated connector facing the low point of incline will be turned inwards whereas the end facing the high point will be turned outwards. This is seen in FIGURE 1 where the arrow direction indicates the low point of the incline. The torsion bar 22 attached to the long wall of the connector and the bracket plate joined to the torsion bar will also turn toward the high point of the incline. The foregoing combination will cant the wing rollers inwards and hold the center roller in a properly maintained position. The longitudinal impact from an overlying load would ordinarily force the center roller forward or in a downstream position or towards the low point of incline, but the turned connectors and offset bracket plates will tend to retain the proper position of the center roller.

The offset bracket plate has a large aperture 71 so that the pin 72 therein has some play when a longitudinal impact strikes the troughing assembly. The shock from such an impact will be transmitted by the bracket plate to the torsion member rather than be absorbed thereby because of the curved contour of the bracket. The torsion member will tend to twist upon such impact in absorbing the shock, but will resume its normal configuration following the impact.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A troughing roller assembly for a rope sideframe conveyor including, in combination,
   a center roller flanked by a pair of wing rollers,
   the rollers being rotatably mounted on center and wing shafts respectively,
   interconnections between an inner end of each wing shaft and an adjacent end of the center shaft, said interconnections enabling relative, vertical, angular movement between the shafts,
   a rope-engageable clamp connected to the outer end of each wing shaft,
   an elongated, twistable, elastic torsion member spaced below and substantially parallel to each wing roller, each torsion member having one end portion secured to one of the clamps and having at the opposite end portion an offset lever arm engaging the corresponding interconnection and restraining that interconnection against displacement in a horizontal direction, whereby tensile loads pass through wing shafts, interconnections and clamps but bypass said offset lever arm and torsion member,
   and an impact load exerted against the rollers in a horizontal direction normal to the rollers deflects said lever arm and twists said torsion member to absorb said impact load by torsional strain in the torsion member.

2. A troughing idler assembly for a wire rope sideframe conveyor having a center roller flanked by a pair of wing rollers, each of said rollers being rotatably mounted on a shaft, the combination which includes:
   an elongated connector for engaging a wire rope,
   an end link connecting each elongated connector with the outer end of each wing roller shaft,
   an interconnecting link connecting the inner end of each wing roller shaft with an adjacent end of the center roller shaft,
   an elongated, twistable, elastic torsion member spaced below and substantially parallel to each wing roller, each torsion member secured to the elongated connector at one end,
   and a non-resilient offset bracket plate joining the other end of the torsion member to the inner end of each wing roller shaft.

3. The combination of claim 2 further characterized in that each elongated connector has means to turn the connector on a wire rope and thereby cant each wing roller toward a downstream position.

4. The combination of claim 2 further characterized in that each bracket plate has a lower portion secured to the end of the torsion bar directly below the inner end of the wing roller shaft and an upper offset portion connected by pivotal linkage to the inner end of each wing roller shaft.

5. In a wire rope sideframe conveyor having spaced lateral wire ropes and a center roller and wing rollers suspended between said ropes, each of said rollers being rotatably mounted on a shaft, the combination which includes:
   an elongated connector engaging each wire rope, the width of the connector greater than the diameter of the rope,
   the outer end of each wing roller shaft linked to the connector to permit horizontal movement,
   the inner end of each wing roller shaft linked to the adjacent end of the center roller shaft to permit vertical movement,
   an elongated, twistable, elastic torsion bar fixed to each elongated connector on one end and the other end received by a matching slot in a collar, said torsion bar spaced directly below and substantially parallel to the length of each wing roller, a non-resilient offset bracket plate joining the collar to the inner end of each wing roller shaft, and means in each elongated connector to turn the connector on the wire rope and thereby cant each wing roller in a downstream direction.

6. The combination of claim 5 further characterized in that each torsion bar is a spring bar of generally rectangular cross section and each collar slot has a generally rectangular configuration.

7. In a wire rope sideframe conveyor having spaced lateral wire ropes, a center roller and wing rollers suspended between said ropes, each of said rollers being rotatably mounted on a shaft, the combination which includes:

an elongated connector engaging each rope, the width of the connector greater than the diameter of the rope, an outer link articulating the outer end of each wing roller shaft with each elongated connector to permit generally horizontal movement, an interconnecting link articulating the inner end of the dead shaft in each wing roller with the adjacent end of the center roller shaft to permit generally vertical movement, a twistable torsion bar directly below and substantially parallel to each wing roller, said torsion bar secured to each elongated connector on one end and the other end securely received within a collar, a non-resilient bracket plate having a lower vertical portion secured to each collar and an offset upper vertical portion pivotally linked to one side of the inner end of each wing roller shaft, and means to turn each elongated connector on the wire rope so that the attached torsion bar and bracket plate cant each wing roller in a downstream direction.

8. In a wire rope sideframe conveyor having spaced lateral wire ropes, a center roller and wing rollers suspended between said ropes, each of said rollers being rotatably mounted on a shaft, the combination which includes:

an elongated connector engaging each rope, said elongated connector having a curved rope seat to loosely enclose the topside of each wire rope, said rope seat having a short wall on one side and a long wall on the other side, means in the short wall of each curved mounting to force a contacted portion of the loosely enclosed wire rope against the long wall and to force a non-contacted portion of the loosely enclosed wire against the short wall, Outer articulating link connecting the outer end of each wing roller shaft to each curved mounting to permit generally horizontal movement, an interconnecting articulating link connecting the inner end of each wing roller shaft with the adjacent end of the center roller shaft to permit generally vertical movement, a twistable torsion bar spaced directly below and substantially parallel to each wing roller and extending along the length of each wing roller, said torsion bar secured to each long wall on one end and the other end received in a matching slot of a collar, and a non-resilient bracket plate having a lower vertical portion secured to each collar and an offset upper vertical portion pivotally linked to one side of the inner end of each wing roller shaft.

References Cited by the Examiner
UNITED STATES PATENTS

| | | |
|---|---|---|
| 2,868,355 | 1/59 | McCann. |
| 3,070,218 | 12/62 | Lo Presti _____ 198—202 X |
| 3,106,287 | 10/63 | Risse _____ 198—192 |

SAMUEL F. COLEMAN, *Primary Examiner.*

WILLIAM B. LA BORDE, *Examiner.*